May 29, 1928.
C. JAMES
1,671,428
CHECK CORRECTING MEANS FOR PLANTERS
Original Filed Dec. 14, 1925  2 Sheets-Sheet 2
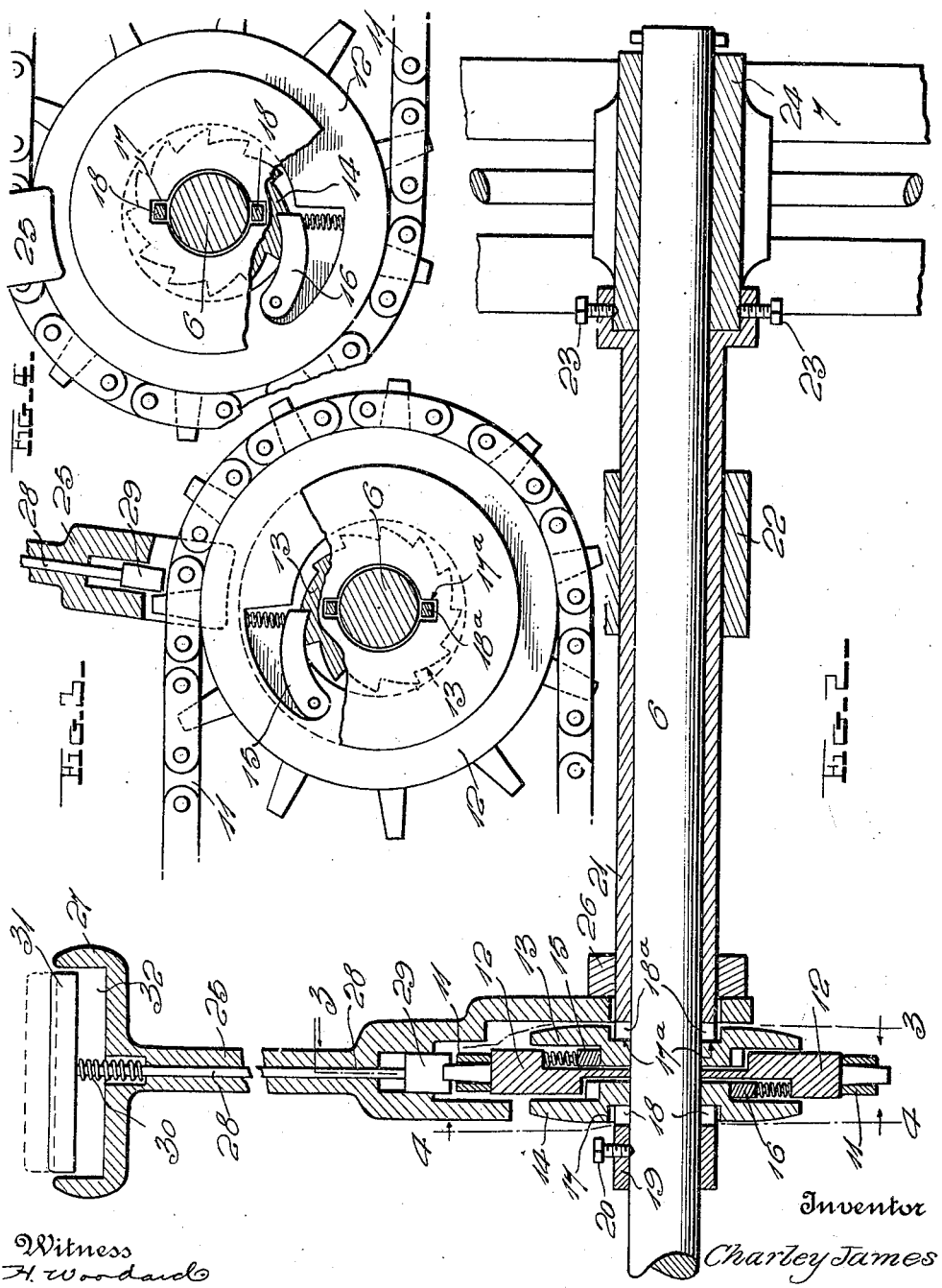

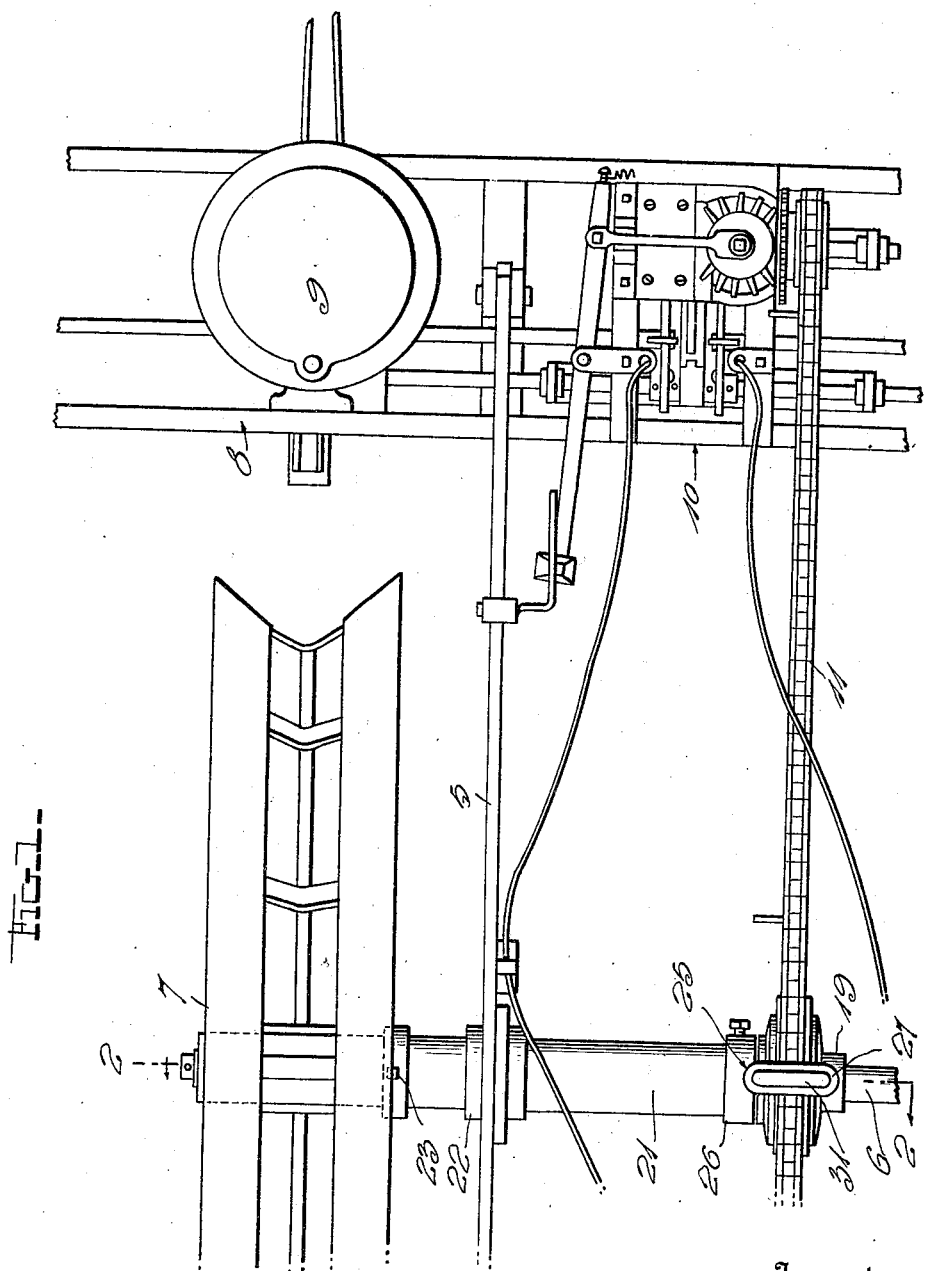

Patented May 29, 1928.

1,671,428

UNITED STATES PATENT OFFICE.

CHARLEY JAMES, OF CORYDON, IOWA.

CHECK-CORRECTING MEANS FOR PLANTERS.

Original application filed December 14, 1925, Serial No. 75,372. Divided and this application filed July 25, 1927. Serial No. 208,367.

This application is a division of my U. S. application, Serial No. 75,372, filed Dec. 14, 1925, patented Aug. 23, 1927, Number 1,640,238.

The invention has reference to planters, such as corn planters, which are provided with seed dropping means driven by the wheels of the planters instead of being actuated by a check wire. Such mechanisms require the use of some efficient check correcting means from time to time, and the present invention aims to provide such a means which will be rather simple and inexpensive, yet will be efficient and reliable.

With the foregoing in view, the invention resides in the novel subject matter hereinafter described and claimed, the description being supplemented by the accompanying drawing.

Fig. 1 is a top plan view of a portion of a planter equipped with the check correcting means.

Fig. 2 is a vertical transverse section on line 2—2 of Fig. 1.

Figs. 3 and 4 are sectional views on the correspondingly numbered lines of Fig. 2.

In the drawing above briefly described, 5 denotes the main frame of the planter, said frame having an axle 6 provided with supporting wheels 7 at its ends, one of these wheels being loose upon the axle while the other is secured to it in the usual manner. The front end of the frame 5 is connected to an auxiliary frame 8 provided with the usual seed dropping units such as 9. 10 denotes operating means for the units 9, constituting no part of the present invention and protected by the allowed application above referred to, and 11 denotes a driving chain for said operating means 10.

The chain 11 is driven by a sprocket wheel 12 which is loose upon the axle 6. Two ratchet wheels 13 and 14 are disposed at opposite sides of the sprocket wheel 12 and have their teeth facing in the same direction, said sprocket wheel being provided with pawls 15—16 co-operating with said teeth respectively. The ratchet wheel 14 is connected with the axle 6 and in the present showing is formed with recesses 17 in its outer side receiving projections 18 on a collar 19, the latter being secured by a set screw or the like 20 to said axle. The ratchet wheel 13 is secured to a sleeve 21 which is free to rotate on the axle 6, and the connecting means between said wheel 13 and said sleeve may well consist of co-operable sockets and lugs 17ª—18ª. The sleeve 21 passes rotatably through one of the bearings 22 of the axle 6 and is secured, for instance, by set screws 23 to the hub 24 of the wheel 7 which is loose on said axle 6.

By providing the pawl and ratchet arrangement and associated features of construction, it is insured that one or the other of the planter wheels shall always drive the sprocket wheel 12, yet the necessary relative turning of said wheels when the machine is turned around at the ends of rows, is permitted.

A lever 25 is loosely mounted at its lower end upon the sleeve 21, between the ratchet wheel 13 and a collar 26 on said sleeve, the upper end of said lever having a hand grip 27. A spring-raised rod 28 is slidable in the lever 24 and is provided at its lower end with a pawl 29 for engagement when desired with teeth of the sprocket wheel 12, the rod and pawl however, being normally raised by means of a spring 30. At the upper end of the rod, a handle 31 is provided, said handle being located in a recess 32 in the hand grip 27. By depressing this handle from the dotted line position of Fig. 2 to the position shown in full lines in this view, the pawl 29 is positioned to engage the sprocket wheel 12. Then, the latter may be turned so as to drive the chain 11 for the purpose of properly setting the seed dropping mechanism at the beginning of any row across the field, or for effecting check correction whenever necessary.

If desired, ball or roller bearings may be used at any or all points of friction and it will further be understood that minor variations as to details, may be made within the scope of the invention as claimed.

I claim:—

1. In a corn planter having a wheel driven axle provided at one end with a loose wheel; a sleeve rotatably surrounding a portion of the axle and secured to the loose wheel, a ratchet wheel connected with the inner end of the sleeve to rotate therewith, a second ratchet wheel connected with the axle to rotate with the latter, a sprocket wheel loosely mounted on the axle between the two ratchet wheels for driving seed-dropping mechanism, pawls carried by the sprocket wheel and engaging the ratchet wheels, a lever mounted on said sleeve for free oscillation with respect thereto, and a projectible and retractible dog on the lever for engagement with the sprocket wheel for turning the latter with respect to the ratchet wheels.

2. In a corn planter having a wheel driven axle provided at one end with a loose wheel, a sleeve rotatably surrounding a portion of the axle and secured to said loose wheel, a planter-operating wheel loose upon the axle, a ratchet connection between said axle and said planter-operating wheel, a second ratchet connection between said sleeve and said planter operating wheel, an oscillatory lever mounted co-axially with the sleeve and axle for oscillation with respect to them, and means for connecting said lever with said planter-operating wheel at will.

In testimony whereof I have hereunto affixed my signature.

CHARLEY JAMES.